United States Patent [19]

Sigl

[11] Patent Number: 4,671,373
[45] Date of Patent: Jun. 9, 1987

[54] VEHICLE WITH LOCKABLE DIFFERENTIAL

[75] Inventor: Alfred Sigl, Sersheim, Fed. Rep. of Germany

[73] Assignee: Robert Bosch GmbH, Stuttgart, Fed. Rep. of Germany

[21] Appl. No.: 674,736

[22] Filed: Nov. 26, 1984

[30] Foreign Application Priority Data

Nov. 25, 1983 [DE] Fed. Rep. of Germany ....... 3342574

[51] Int. Cl.$^4$ .......................... B60K 23/04; B60T 8/32
[52] U.S. Cl. ...................................... 180/197; 74/711; 180/76
[58] Field of Search ................... 180/76, 75, 197, 271, 180/6.2, 248, 249; 74/711, 710.5, 866, 877, 870

[56] References Cited

U.S. PATENT DOCUMENTS

| 2,722,134 | 11/1955 | Cabell | 74/877 |
| 2,874,790 | 2/1959 | Hennessey | 180/6.2 |
| 3,138,970 | 6/1964 | Costa | 74/711 |
| 3,706,351 | 12/1972 | Neisch | 180/76 |
| 3,771,839 | 11/1973 | Fink | 180/76 |
| 4,432,430 | 2/1984 | Lind | 180/197 |
| 4,467,886 | 8/1984 | DeClaire | 74/710.5 |
| 4,511,014 | 4/1985 | Makita | 180/197 |
| 4,523,494 | 6/1985 | Sparks | 74/711 |

FOREIGN PATENT DOCUMENTS 8102049 7/1981 World Int. Prop. O. ............ 74/711

2109882 6/1983 United Kingdom .

Primary Examiner—John J. Love
Assistant Examiner—Everett G. Diederiks, Jr.
Attorney, Agent, or Firm—Frishauf, Holtz, Goodman & Woodward

[57] ABSTRACT

A locking-type differential (5; I, II) is automatically engaged to locked position upon sensing of certain vehicle operating conditions, and unlocked upon sensing other vehicle operating conditions. If the steering wheel is deflected, or transverse acceleration is sensed, the differential is inhibited from locking; likewise, if the brakes are applied, or the engine is operating under idle condition, the locking-type differential is either unlocked or prevented from locking. On the other hand, if a kick-down signal from the accelerator is sensed, or if the difference in speed of driven and rolling wheels exceeds a predetermined amount, thus indicating slippage of the driven wheel, or if a brake applied to the driven wheel is then engaged, and the speed between the wheels coupled to the differential has become essentially uniform (FIG. 2, terminal 17), the differential is controlled to lock. Two axles may have differentials applied thereto, for example in four-wheel drive vehicles, and the criteria for the locking of the second differential may be similar or, for example, include reduction of drive torque being applied by the engine. Suitable time delays can be provided in the circuitry to prevent spurious response under transient conditions.

19 Claims, 4 Drawing Figures

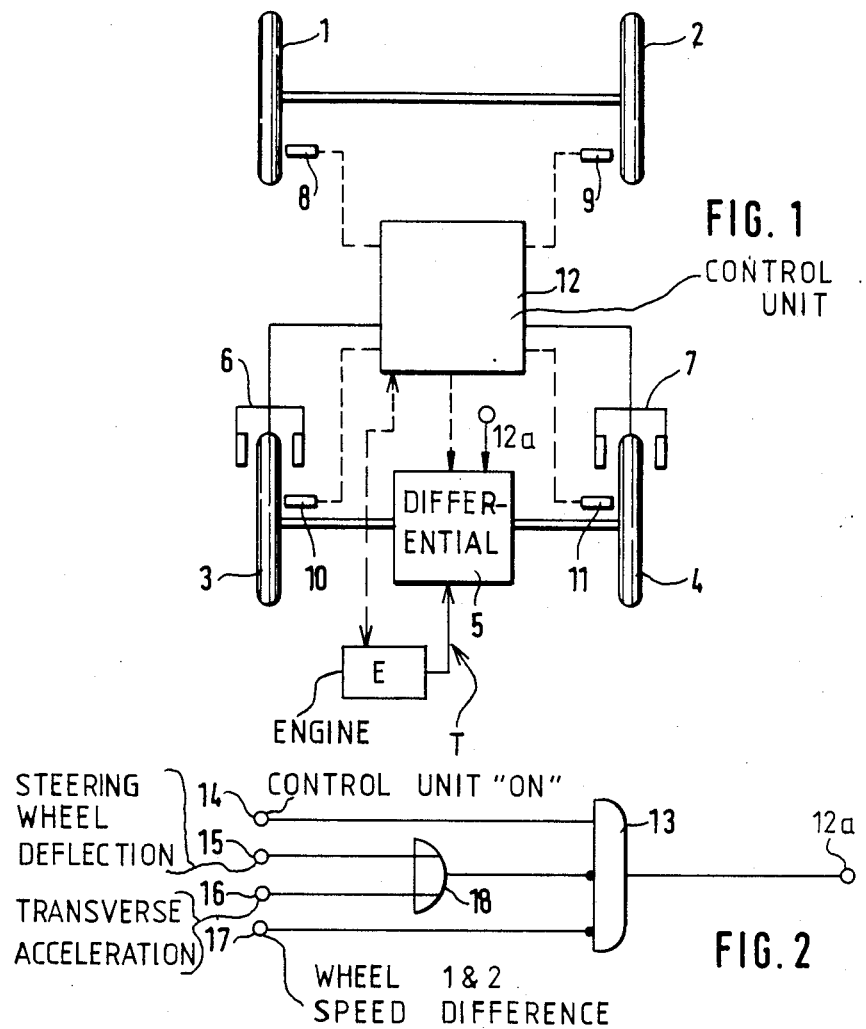

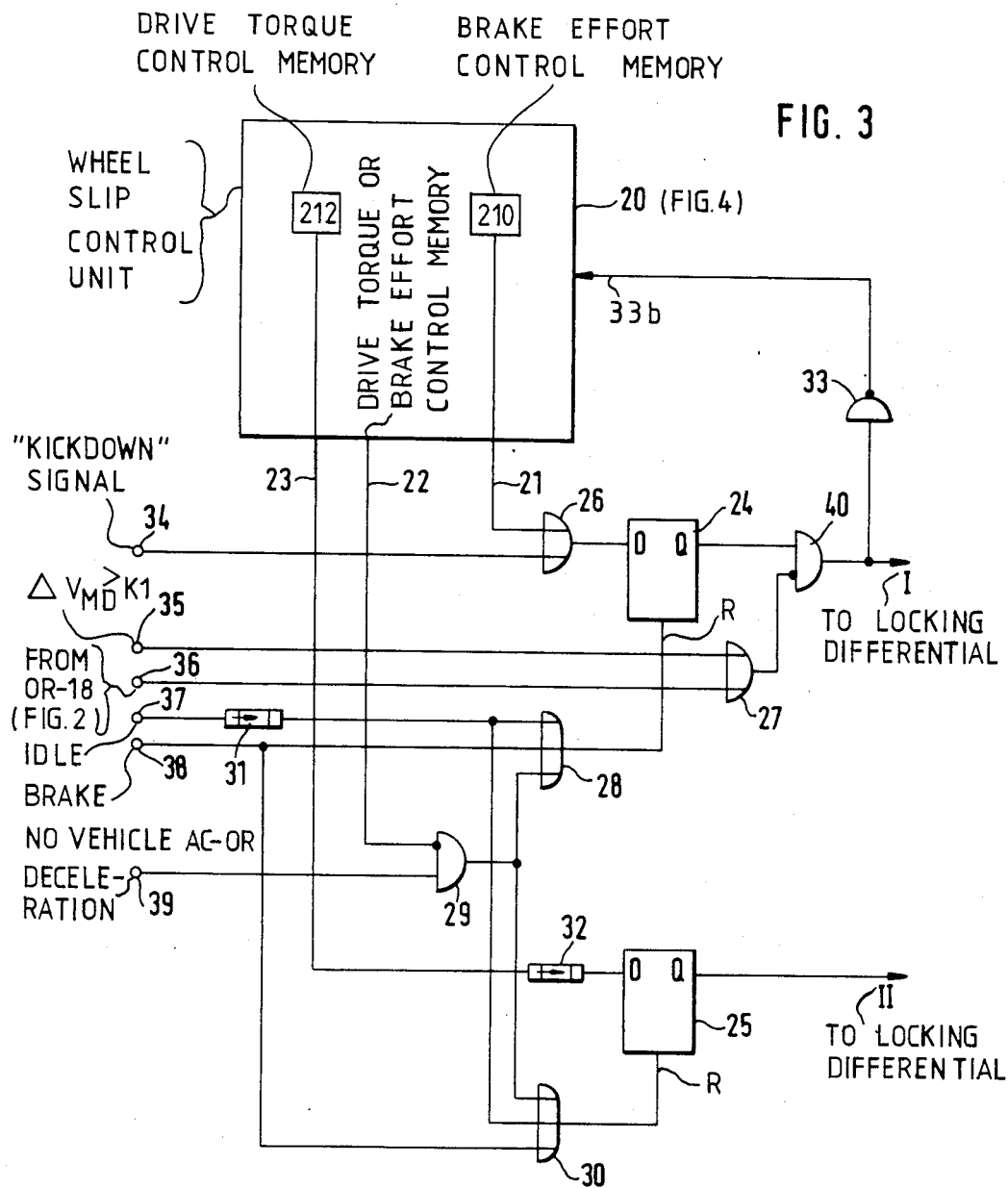

VEHICLE WITH LOCKABLE DIFFERENTIAL

The present invention relates to an automotive vehicle having wheels operable about wheel shafts or an axle, in which a locking apparatus is provided so that the wheels on both sides of the vehicle will operate at essentially the same speed. Apparatus is provided to prevent slippage or spinning of the driven wheels. Typically, the vehicle has a locking-type differential in which the locking action of the differential can be controlled based on then existing vehicle operating conditions.

BACKGROUND

It has previously been proposed to construct differentials which can be manually locked; such locking-type differentials, then, will drive both wheels on a common axle at the same speed so that slippage of one wheel, for example on an icy or otherwise slippery surface, will not prevent traction from being applied to the other wheel on the same axle. It is also known to control the torque applied by the engine of the vehicle to the wheels such that, upon acceleration, the wheels will not slip or spin. Frequently, dual control can be used, in which, upon spinning of one wheel, a brake is applied to the spinning wheel, thereby applying additional torque to the other wheel on the axle, connected to the braked wheel by a differential; it is also known to lower the torque applied to the wheels, upon spinning of one or both of the wheels—see, for example, German Pat. No. 3,127,301 to which British No. 2,109,882 corresponds.

THE INVENTION

It is an object to improve traction which can be applied by the wheels of a vehicle, and to automatically engage a locking mechanism or lock a differential, if a tendency of a wheel to spin or slip is to be expected. Desirably, also, the guidance or stability of driving and road holding is insured by also controlling torque being applied to the wheels.

Briefly, a control unit is provided which controls the rotation of the wheels based on sensed slippage, or incipient slippage of any one of the driven wheels. This control of wheel rotation can be effected by either one, or both of the following:

(1) braking of each of the respective wheel or wheels which slip or have a tendency to slip;

(2) control of drive torque applied by the engine to a wheel or wheels.

This wheel control is combined with a locking differential. Engagement of the lock of the locking differential, to lock the wheels of an axle together, is commanded by the control unit when the speeds of the wheels of the axle, coupled to the differential, are a predetermined relation, that is, for example, is below a predetermined value K1.

Incipient slippage of the wheel can be determined, for example, upon sensing "kickdown" of a fuel controller, which might cause spinning of both driven wheels and, if such is sensed, and the difference in speeds of the wheels coupled to an axle of a differential are below the predetermined value K1, the differential will lock; at the same time, the drive torque applied to the engine is controlled to be decreased.

If one of the driven wheels spins, for example as sensed by determining a substantial speed difference between that one wheel and other wheels, which may be driven, or rolling, the control unit applies a brake to the wheel having the highest speed and, when the speed difference between that wheel and another one coupled thereto by the lockable differential has fallen below the predetermined value K1, the lockable differential is automatically controlled to lock by the control unit.

Control of braking torque of each of the wheels which slips, or has a tendency to slip, particularly when coupled with control of the drive torque being applied to the respective wheel, insures stability of operation of the vehicle while, simultaneously, providing for optimal traction. Automatic locking of the differential, for example by coupling the locking element to locked position, can also be used in vehicles in which the torque applied to the wheels is not specifically controlled. In such systems, an electrical differential locking signal can be generated if conditions are sensed which would control torque being applied to the wheels if a torque controller would be provided; or if a system is provided in which brakes would be controlled to become operative to reduce slippage or spinning of a wheel. The combination of drive control—whether by torque being applied to the wheels or braking being applied to the wheels which, in either case, controls tractive effort applied by the wheel to the road surface, with an automatically engageable differential lock is preferred since, thereby, stability of the vehicle is substantially enhanced without essentially increasing the apparatus requirements. It is, then, also possible to engage the differential lock only when the wheels are both brought to the same operating speed by a drive control operation, i.e. by controlling torque and/or braking of a wheel which spins or slips or has a tendency to spin or slip. By engaging the lock only when both wheels of an axle are operating at essentially the same speed, jolts or sudden shocks are avoided, and a soft transition from little or no traction to tractive effort being applied to the vehicle is obtained.

The system can be multiplied in its effect if, for example, it is intended to be applied to four-wheel drive vehicles or, in general, multiple-axle drive vehicles, in which the respective wheels of additional axles are coupled by a lockable differential and/or the respective axles are further coupled together by additional differentials. It is, thus, possible, with minimum apparatus requirements, to provide for a stiff transmission to all driven wheels of a multi-axle drive vehicle or, selectively, to couple the wheels of selected axles together, or all the wheels of all the axles, or all the wheels of some of the axles.

The criteria for engagement and disengagement of the lock, as well as intervention into control loops already present in the vehicle (in order to obtain locking or unlocking of differentials), can be determined by known apparatus and by use of elements well known in the field of wheel and wheel braking control.

DRAWINGS

FIG. 1 is a schematic general diagram of the system in accordance with the invention, illustrating a two-wheel driven vehicle with a locking-type differential;

FIG. 2 is a schematic basic control system to show how an electrically lockable differential can be controlled;

FIG. 3 is a general diagram for a system with two locking-type differentials.

DETAILED DESCRIPTION

Figure 4:
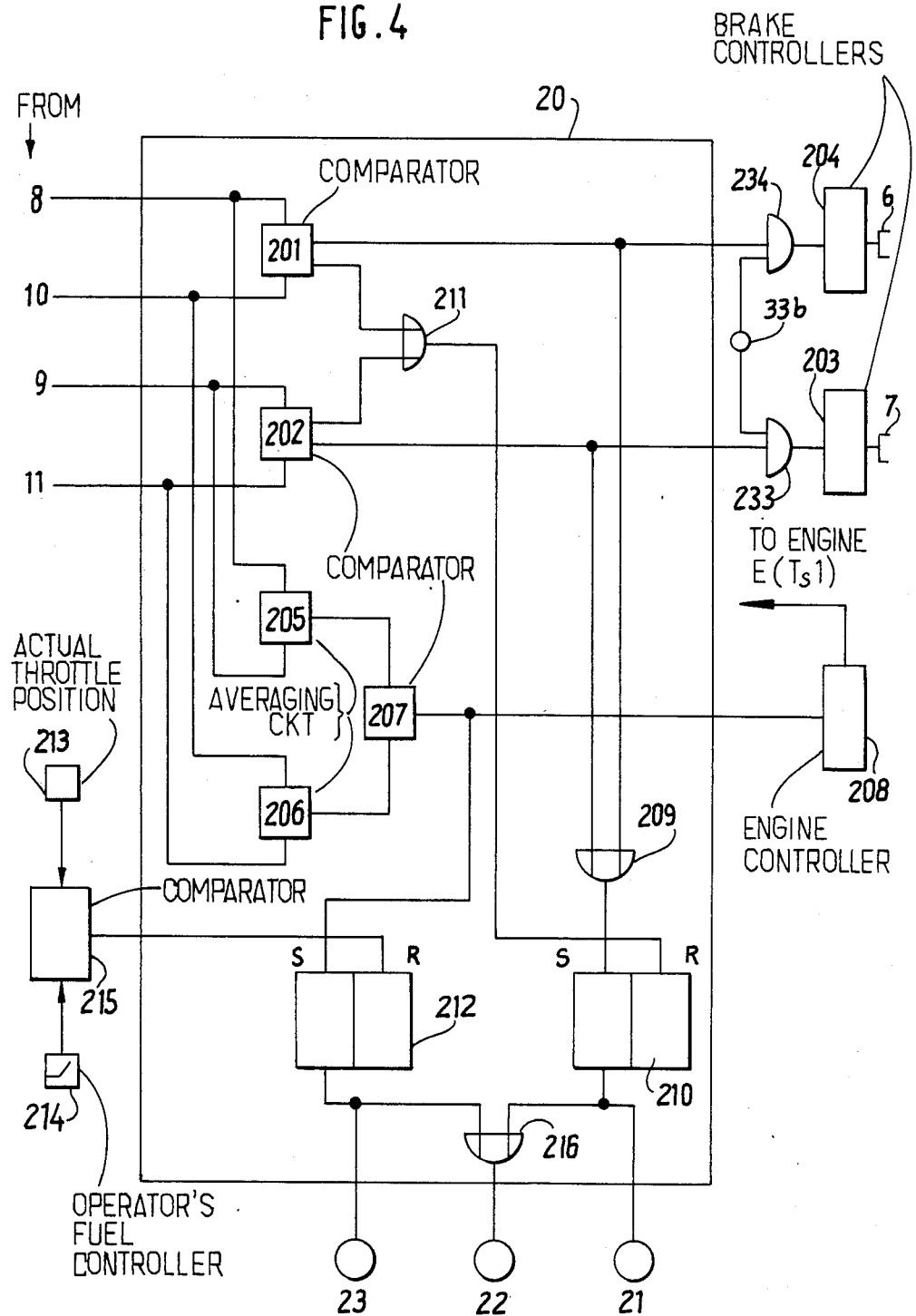
FIG. 4 is a detail diagram of a wheel slip signal generating system, and control unit.

The rolling wheels 1, 2 of a vehicle (FIG. 1) are connected by an axle; these wheels are not driven. The driven wheels 3, 4 are connected shafts which, in turn, are interconnected by a locking-type differential 5. The locking-type differential 5 may be of any suitable construction, and, for example, can permit locking of the wheels 3, 4 together upon energization of a positioning magnet, solenoid, or the like. The vehicle has an engine E, shown only schematically, which is connected to the locking-type differential by a suitable drive train including, for example, clutch, transmission and the like, and shown only schematically by connection T. The wheels 3, 4 each have a brake 6, 7 associated therewith, shown only schematically. Each one of the wheels 1, 2, 3, 4 further has a wheel speed sensor 8, 9, 10, 11, respectively, associated therewith, sensing the rotational speed of the respective wheels. Such wheel speed transducers or sensors are well known and may be of any suitable construction, for example inductive pick-up or the like.

The signals from the transducers or sensors 8–11 are applied to a control unit 12. The electrical lines in the diagram of FIG. 1 are shown as broken lines, the hydraulic connection in solid-line form. Control unit 12 controls application of braking pressure, for example pressurized brake fluid to the brakes 6, 7, and, respectively, locking or release of locking of the differential 5. Control of the brakes 6, 7 and, for example, of brakes of the rolling wheels 1, 2, not shown and omitted from the diagram for clarity, can be in accordance with any well known and suitable system, for example in accordance with an automatic antiskid brake system or the like, described in literature relative to the technology of antilock or antiskid brake systems. The lock in the differential 5 can be engaged, for example, by a circuit as shown in FIG. 2. Control of the brakes 6, 7 of the driven wheels is effected by the control unit 12, for example, by sensing the speed of the respective wheels in sensors 10, 11, comparing the sensed speeds and, if the difference in speed of one wheel and of another exceeds a predetermined limit—and, for example, if in addition a direction sensor determines that the vehicle is not going around the curve, for example by sensing that a steering wheel is not deflected, one or the other or both of the brakes 6, 7 are suitably controlled to brake that one of the wheels which has a speed substantially in excess of the other. Comparison can also be done between, for example, the speeds of the wheels on one side; thus, for example, if the speed of wheel 1 and 3 differs, the brake 6 can be controlled to be engaged by the control unit 12, by simple comparison of the output signals from sensors 8, 10.

FIG. 2 illustrates the locking control circuit. A "lock" control signal is generated by an AND-gate 13 which provides an output signal at terminal 12*a*, for example applied to the differential 5 to energize a locking magnet therein. The AND-gate 13 receives the following input signals: on terminal 14, a signal that the control unit 12 is in operation, and that a suitable torque and/or brake control system, for example an automatic antiskid brake system (ABS) is in operation. Terminal 15 has a signal applied thereto representative of steering wheel deflection, or rotation, in other words, that the vehicle is steered to go around a corner. Terminal 16 has a signal applied thereto representative of transverse acceleration, which can be used in lieu of the signal at terminal 15, or in addition thereto, or as a monitor for the signal 15. A signal on terminal 16 may also arise if, for example, no deflection of the steering wheel has been signaled at terminal 15 but, due to road conditions, the vehicle is operating in a curve. Terminal 17 has a signal applied thereto which indicates that one of the rolling wheels, for example wheel 1, operates at a speed which differs from the speed of wheel 2 by a predetermined value. The three signals at terminals 15, 16, 17 are alternatives, and may be used singly or all together, as shown, for additional redundancy control, all indicating that the vehicle opeates in a curve. The signals from terminals 15, 16, 17 are applied to the AND-gate 13 through inverting inputs (FIG. 2). Of course, as well known, it is not appropriate to engage the lock in a locking differential when the vehicle operates in a curved path, or to leave a locked differential in a locked condition.

Overloading of the brakes is avoided by the combination of a locking differential with the drive control, during operation. Additionally, by locking the wheels 3, 4 together, the system avoids waste of energy, and transfer of drive energy from the engine E to the differential and heating the brake of that wheel which slips or spins or has a tendency to do so, as sensed by the respective sensor 10, 11.

Referring now to FIG. 3, which shows the system in greater detail: The wheel slip control unit 20—explained below with reference to FIG. 4—provides an output signal on line 21 if a brake effort control memory 210, i.e. a flip-flop (FIG. 4) is SET. This brake effort control memory is SET if a driven wheel on a side of the vehicle has a predetermined difference in speed with respect to a nondriven wheel on the same side, thus indicating spinning of the respective driven wheel; and, if desired, if the spinning wheel also accelerates at a rate exceeding a predetermined acceleration. Sensing the speed, of course, is simple by the sensors 10, 11 and the acceleration is obtained merely by differentiating the signal. Comparison with similar data from the nondriven or rolling wheel 1, for example, can be carried out in any comparator, well known. The brake effort control memory is RESET when the speed of the rolling wheel is the same or higher than the speed of the driven wheel for a predetermined period of time, for example just long enough to eliminate the effects of transient conditions.

Line 23 from the wheel slip control unit 20 provides an output signal when a drive torque control memory 212 within unit 20 is SET. Such a drive torque control memory is SET if, for example, the average speed of the driven wheels ($V_{MD}$) exceeds the average speed ($V_{MR}$) of the rolling wheels by a predetermined value. The drive torque control memory is RESET when the actual position of a fuel controller for the engine, for example a throttle, a fuel injection control or the like, corresponds to a commanded value as determined, for example, by a sensed position of an accelerator or "gas pedal" of the vehicle, and, additionally, is below a level determined by an engine torque controller. Line 22 provides an output signal if either one of the memories connected to line 21 or 23 is SET.

FIG. 3 illustrates the system for two locking-type differentials I, II; the two differentials are not shown separately in FIG. 1; they may, for example, form the differentials for driven rear wheels and selectively driven front wheels in a four-wheel drive vehicle in which the rear wheels or the front wheels can be, selectively, connected to be driven by the engine E.

The control system which applies the "lock" signals to the differentials I, II includes two bistable circuits, for example flip-flops (FFs) 24, 25 and connecting gates 26–30, 40, timing elements 31 and 32, and an inverter 33. The system receives input signals over terminals 34–39 in accordance with the following criteria:

Terminal 34: This terminal has a signal thereon representative of the possibility of slippage of the wheels. The signal can be derived from a fuel controller, for example, a throttle. The signal is changed if the throttle is changed by the operator by an amount in excess of a predetermined amount within a predetermined limited time, for example by kick-down of the controller, e.g. of a "gas pedal".

Terminal 35: The difference in speed of the driven wheels, i.e. speed of a driven wheel, for example 3 and a reference speed, the speed of another driven wheel 4 differ by more than a predetermined value. This difference is indicated as $\Delta V_{MD}$ in FIG. 3, and a signal will appear on terminal 35 if it is in excess of a value K1, for example, is a predetermined constant value.

Terminal 36: The steering wheel deflection exceeds a predetermined value, or a transverse acceleration has been sensed.

This terminal corresponds, for example, to the output from OR-gate 18, FIG. 2.

Terminal 37: Fuel controller is at, or in the vicinity of, zero or idle position.

Terminal 38: Brake being operated.

Terminal 39: No change in speed, i.e. deceleration or acceleration of the vehicle is sensed.

The interconnection of the various gates, FFs, and the timing elements is clear from the diagram of FIG. 3.

OPERATION

Let it be assumed that line 21, from unit 20 has a signal appear thereat. This signal will occur if the braking pressure is controlled, for example by an ABS, or the like; or if, alternatively, a signal is derived from terminal 34 representing sudden acceleration of the engine, for example a "kick-down" signal. These signals, from line 21 or terminal 34, will be applied to the FF 24 to SET FF 24. Let it further be assumed that neither of terminals 35 or 36 have a signal thereat, which is inverted and applied to the AND-gate 40 so that the differential I can be locked. The AND-gate 40 prevents engagement of the lock I, or controls disengagement if, either, the speed difference between wheels 3 and 4, or a wheel and K1, is too high to permit locking, or a transverse acceleration or wheel deflection, indicative of a curved path of the vehicle, is sensed over terminals 35, 36, respectively. As long as the AND-gate 40 provides a signal, the inverter 33 will feed back the signal to the unit 20 to disconnect braking effort since, then, the cross connection or locking of the differential no longer requires such braking control or would make sense.

FF 24 is RESET, and the lock 1 is released when OR-gate 28 applies a signal to the reset terminal R of the FF 24. Such a signal must persist for a predetermined time period, for example ½ second, controlled by the timing element 31, during which the fuel controller is in idle position (terminal 37); if the brakes of the vehicle are applied (terminal 38) or the vehicle deceleration has become zero—terminal 39—and if none of the control memories, line 22 from unit 20—provide an output signal.

This is the basic system, which can readily be expanded, as shown in FIG. 3, to include a second locking differential II. Let it be assumed that wheels which previously were rolling wheels, that is, were not driven, can be connected through a second locking differential II with the engine E (FIG. 1) of the vehicle. The locking differential II can likewise be automatically engaged in accordance with predetermined criteria, as follows: If the drive torque control memory has been SET for a predetermined period of time, as indicated by an output at line 23, timing circuit 32 which, for exampe, may have a ½ second timing period, will be enabled, and the FF 25 will have been SET. The reset criteria, applied to the terminal R of FF 25, are the same as those for the resetting of the FF 24, of differential 1, and, as can be seen, the OR-gates 28, 30 are connected in parallel.

FIG. 4 is a block diagram of an example of the wheel slip control unit 20.

The wheel slip control unit 20 has signals from the sensors 8–11 applied thereto, which provide signals representative of the then existing operating speed of the respective wheels. The signals from the wheels 1 and 3 at one side of the vehicle, and from the wheels 2 and 4, on the other, respectively, are compared in comparators 201, 202. If the signals differ by a preset value K2 from each other, brake control elements 203, 204 will apply braking effort to the driven wheels at the respective side of the vehicle, for example by opening a valve admitting pressurized brake fluid to the brakes 6, 7, respectively. Averaging circuits 205, 206 form the average values of the wheel speeds of the driven wheels—in circuit 206, and of the rolling wheels—in circuit 205. The average speeds are compared in comparator 207. If the average value of the driven wheels differs in a positive direction from the average speed value of the rolling wheels, an output signal is applied to an engine controller 208 which provides an output signal to the engine E in the direction to reduce the torque delivered by the engine, for example by reducing fuel being supplied to the engine.

The output lines from comparators 201, 202 are additionally connected to an OR-gate 209, which provides a 1-signal output if either of the comparators 201, 202 sense a deviation in speed between the driven and rolling wheels, on one side, in excess of a predetermined value. This output signal is applied to an FF 210 which forms the brake effort control memory and delivers an output signal over line 21 (FIG. 3). The FF 21 is RESET by the comparators 201, 202, connected through an OR-gate 211 if the output signals from the respective comparators indicate that there is no substantial deviation between the speeds of the driven and rolling wheels at any one side, respectively. .

A second FF 212, forming the drive torque control memory (FIG. 3) is SET by an output from comparator 207, to provide an output on line 23 (FIG. 3) if the average speed of the driven wheels differs from the average speed of the rolling wheels by a predetermined value. FF 212 is RESET if the position transducer 213 for the fuel control, for example for the throttle of the engine, and the operator's control pedal provide signals which are at least in approximate accord, as compared in a comparator 215.

OR-gate 216 provides an output signal when either one of lines 21 or 22 has a 1-signal output applied thereto, as explained in connection with the output from line 22, FIG. 3, that is, if at least one of the FFs 210, 212 is SET.

FIG. 4 includes the customary notation with the letters S and R applied, respectively, to the SET and RESET terminals of the respective FFs.

Various changes and modifications may be made within the scope of the inventive concept.

For example, the inverter 33 is not strictly necessary, and the output line 33b thereof connected to the wheel slip control unit 20 need not be used. If used, however, the output 33b is, preferably, connected through AND-gates 233, 234 between the brake controllers 203, 204.

I claim:

1. Automotive vehicle with wheels (1, 2, 3, 4), at least two (3, 4) of which are driven wheels, wherein said driven wheels (3, 4) have respective wheel shafts, said vehicle having an engine (E);

a locking-type differential (5) coupling the engine (E) to the shafts of the driven wheels (3, 4), the locking-type differential being selectively operable to lock the wheels together to drive both wheels with similar speeds from the engine, or, upon being unlocked, permit different speeds of the wheels;

means (12, 20) for controlling slippage or incipient slippage of at least one of the driven wheels upon detection of conditions leading to or causing slippage of said at least one of the wheels, to thereby prevent such slippage of said at least one wheel, comprising signal generating means (8-11, 201, 202, 209, 210; 34) for generating wheel slip or incipient wheel slip signals, representative of actual slipping or incipient slipping of at least one of the driven wheels (3, 4);

wheel speed difference generating means (35) for generating a driven wheel speed difference signal ($V_{MD}$) when the speeds of driven wheels (3, 4) coupled to the locking-type differential (5) differ by a predetermined value (K1);

a control unit (12, 13-18; 21, 24, 26) controlling the locking-type differential (5) for, respectively, locking said differential by providing a locking signal thereto, said control unit being coupled to and receiving said wheel slip or incipient wheel slip signals and said wheel speed difference signals;

wherein the locking-type differential is electrically controllable to lock the wheels together or permit independent drive to the wheels from the engine (E);

wherein the control unit controls the locking of the locking-type differential by providing locking control signal thereof if (a) the wheel slip or incipient wheel slip signals are sensed, and (b) the wheel speed difference signal ($V_{MD}$) is below said predetermined value (K1); and wherein the vehicle includes brake (6,7) coupled to brake the driven wheels (3, 4);

said control unit is coupled to the brakes of the driven wheels and controls the brakes of the driven wheels in dependence of the signals of the signal generating means (8-11, 201, 202; 209, 210; 34), and when the wheel speed difference generating means (35) senses that the speed difference of one of said driven wheels (3) to the other driven wheel (4) coupled to the locking-type differential (5) on the same axle of the vehicle have a difference value which is below said predetermined value (K1) for then engaging the locking-type differential.

2. Vehicle according to claim 1, wherein the slip signal generating means includes a kickdown signal generator (214; 214, 215) responsive to provide an incipient wheel slip signal upon sudden operation of an engine fuel control element (214).

3. Vehicle according to claim 2, including engine control means (208) coupled to the engine (E) and to said control unit (12, 20) and controlling the engine (E) to reduce torque upon receipt in the control unit of a wheel slip or incipient wheel slip slignal.

4. Vehicle according to claim 1, including a second locking-type differential (II), coupled to wheels of a second axle; and wherein, in accordance with the invention, the control unit (20; 13-17, 21, 24, 26) includes means (23; 25, 32, 29, 30) coupled to the second locking-type differential for providing a locking and unlocking signal, respectively, to the second locking-type differential upon receiving said input signals representative of incipient or actual slipping of wheels, from said drive torque application control means.

5. Vehicle according to claim 4, including a brake control terminal (38) providing a brake control signal representative of operation of a brake of the vehicle;

said brake control signal being coupled to the control unit to effect unlocking of both differentials (I, II) controlled by the control unit.

6. Vehicle according to claim 4, further including engine idle signal generating means (37) for providing an engine idle signal indicative of operation of the engine (E) under idle or approximately idle condition, said engine idle signal being coupled to the control unit (12, 13-18; 21, 24, 26) to provide for unlocking of the locking-type differentials (I, II).

7. Vehicle according to claim 6, further including a timing element (31) providing the engine idle signal from said engine idle signal generating means (37) only if the engine idle signal persists for a predetermined time interval.

8. Vehicle according to claim 1, including a brake control terminal (38) providing a brake control signal representative of operation of a brake of the vehicle;

said brake control signal being coupled to the control unit to effect unlocking of the differential controlled by the control unit.

9. Vehicle according to claim 1, further including engine idle signal generating means (37) for providing an engine idle signal indicative of operation of the engine (E) under idle or approximately idle condition, said engine idle signal being coupled to the control unit (12, 13-18; 21, 24, 26) to provide for unlocking of the locking-type differential.

10. Vehicle according to claim 9, further including a timing element (31) providing the engine idle signal from said engine idle signal generating means (37) only if the engine idle signal persists for a predetermined time interval.

11. Vehicle according to claim 1, further including vehicle speed change signal generating means (39) providing a vehicle speed change signal representative of change of speed of the vehicle, said vehicle speed change signal being coupled to the control unit to effect unlocking of the locking-type differential (5) if the rate of change of speed of the vehicle has dropped below a predetermined value.

12. Vehicle according to claim 1, wherein said control unit includes comparator means (201, 202) having applied thereto signals representative of wheel speed of a driven and a rolling wheel, respectively, of the vehicle, and providing said wheel slip signal if the difference in the speed (17, 36, 13, 27) between a driving and a rolling wheel exceeds the preset level.

13. Vehicle according to claim 1, including curve sensing means (15, 16) for sensing if the vehicle is operating in a curved path; and, if said curved path is sensed, generating (18) an inhibit signal to inhibit locking of the locking-type differential (5) if the vehicle is in said curved path.

14. Vehicle according to claim 1, including means (203, 204) for applying, selectively, a vehicle brake (6, 7) to a driven wheel (3, 4); and
wherein said control unit (20) includes
means (233, 234; 33b) coupled to the brakes of the driven wheels to release braking by said brake applying means when said control unit provides a locking signal to the locking-type differential (5, I, II).

15. Vehicle according to claim 1, wherein the engine includes a fuel controller, and
said slip signal generating means includes means for providing an output signal upon change in position of the fuel controller for the engine (E) of the vehicle within a predetrmined limited time period.

16. Vehicle according to claim 1, including engine control means (208) coupled to the engine (E) and to said control unit (12, 20) and controlling the engine (E) to reduce torque upon receipt in the control unit of a wheel slip or incipient wheel slip signal.

17. Vehicle according to claim 1, wherein said slip signal generating means includes
driven wheel speed signal generating means (10, 11) coupled to the driven wheels (3, 4) of the vehicle;
rolling wheel speed signal generating means (8, 9) coupled to rolling wheels of the vehicle; and
comparator means (207) coupled to receive said rolling wheel speed signals and said driven wheel speed signals, and responsive to provide a wheel slip signal when the difference in the speeds of the rolloing wheels and the driven wheels is above a predetermined limit.

18. Automotive vehicle with wheels (1, 2, 3, 4), at least two (3, 4) of which are driven wheels, wherein said driven wheels (3, 4) have respective wheel shafts, said vehicle having
an engine (E);
a locking-type differential (5) coupling the engine (E) to the shafts of the driven wheels (3, 4), the locking-type differential being selectively operable to lock the wheels together to drive both wheels with similar speeds from the engine, or, upon being unlocked, permit different speeds of the wheels;
means (12, 20) for controlling slippage or incipient slippage of at least one of the driven wheels upon detecting of conditions leading to or causing slippage of said at least one of the wheels, to thereby prevent such slippage of said at least one wheel, comprising
signal generating means (8–11, 201, 202; 209, 210; 34) for generating wheel slip or incipient wheel slip signals, representative of actual slipping or incipient slipping of at least one of the driven wheels (3, 4);
wheel speed difference generating means (35) for generating a driven wheel speed difference signal ($V_{MD}$) when the speeds of driven wheels (3, 4) coupled to the locking-type differential (5) differ by a predetermined value (K1);
a control unit (12, 13–18; 21, 24, 26) controlling the locking-type differential (5) for, respectively, locking said differential by providing a locking signal thereto, said control unit being coupled to and receiving said wheel slip or incipient wheel slip signals and said wheel speed difference signals;
wherein the locking-type differential is electrically controllable to lock the wheels together or permit independent drive to the wheels from the engine (E);
wherein the control unit controls the locking of the locking-type differential by providing locking control signals thereto if
(a) the wheel slip or incipient wheel slip signals are sensed, and
(b) the wheel speed difference signal ($V_{MD}$) is below said predetermined value (K1); and
wherein the vehicle includes means (208) controlling engine torque application to the drive wheels,
an engine torque signal generating means (212) providing a signal if the torque of the engine is controlled by said torque application control means;
brakes (6, 7) coupled to the driven wheels (3, 4) of the vehicle;
brake signal generating means (203, 204) providing brake signals if at least one of the brakes is controlled to apply the respective brake to the respective wheel;
an OR-function gate (216) receiving the engine torque signal and the brake signal applied thereto and providing an output signal if the torque of the engine or one of the brakes is controlled by the respective torque application control means;
vehicle speed sensing and vehicle speed change signalling means; and logic means (29) coupled to the output of the OR-function gate (216) and further coupled to receive a vehicle speed change signal, representative of change of speed of the vehicle, said logic means (29) conjunctively controlling unlocking of the locking-type differential (5) if the vehicle speed rate-of-change is below a predetermined value and there is no signal applied from said OR-function gate (216).

19. Vehicle according to claim 18, including engine control means (208) coupled to the engine (E) and to said control unit (12, 20) and controlling the engine (E) to reduce torque upon receipt in the control unit of a wheel slip or incipient wheel slip signal.

* * * * *